(12) United States Patent
Janes et al.

(10) Patent No.: US 7,165,929 B2
(45) Date of Patent: Jan. 23, 2007

(54) LOAD BEARING MEMBER ARRANGEMENT AND METHOD

(75) Inventors: Brian J. Janes, Chillicothe, IL (US); Christy L. Lee, Eureka, IL (US); Dirk J. Schreuder, Peoria, IL (US); Charles F. Sieck, Dunlop, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/028,580

(22) Filed: Dec. 20, 2001

(65) Prior Publication Data

US 2003/0118433 A1 Jun. 26, 2003

(51) Int. Cl.
*B66C 23/00* (2006.01)

(52) U.S. Cl. .......................... 414/722; 52/111; 52/116; 52/117

(58) Field of Classification Search ............... 414/722; 29/891; 52/111, 116, 117
See application file for complete search history.

(56) References Cited

U.S. PATENT DOCUMENTS

| | | | | |
|---|---|---|---|---|
| 3,902,295 | A | * | 9/1975 | Yancey ..................... 37/379 |
| 4,214,923 | A | * | 7/1980 | Price ......................... 148/529 |
| 4,428,173 | A | * | 1/1984 | Knell ........................ 52/731.6 |
| 5,111,602 | A | * | 5/1992 | Risch ......................... 37/406 |
| 5,152,659 | A | * | 10/1992 | Waka ........................ 414/722 |
| 5,245,770 | A | | 9/1993 | Ko et al. |
| 5,316,709 | A | * | 5/1994 | Ko et al. ...................... 264/51 |
| 5,593,234 | A | * | 1/1997 | Liston ........................ 384/492 |
| 5,611,657 | A | * | 3/1997 | Peterson ..................... 414/722 |
| 5,806,313 | A | * | 9/1998 | Koshi et al. .................... 60/458 |
| 5,993,139 | A | * | 11/1999 | Deneve et al. ............... 414/722 |
| 6,060,682 | A | * | 5/2000 | Westbroek et al. ..... 219/121.64 |
| 6,071,033 | A | * | 6/2000 | Neitzel et al. ............... 403/158 |
| 6,158,949 | A | * | 12/2000 | Walth et al. ................. 414/722 |
| 6,324,491 | B1 | | 11/2001 | Zhang et al. |
| 6,334,252 | B1 | * | 1/2002 | Sato et al. ................... 29/897.2 |
| 6,409,459 | B1 | * | 6/2002 | Ginn et al. .................. 414/685 |

FOREIGN PATENT DOCUMENTS

| | | |
|---|---|---|
| GB | 2 343 173 A | 5/2000 |
| GB | 2343173 A | 5/2000 |
| WO | WO 01/24966 A1 | 4/2001 |
| WO | WO 01/30532 A1 | 5/2001 |

OTHER PUBLICATIONS

Wakil, "Processes and Design for Manufacturing", Prentice-Hall, 1989, pp. 71-73,85-91.*
CALCE internet web page "Material Hardness", http://www.calce.umd.edu/general/Facilities/Hardness_ad_.htm.*
"Material Definitions", web page, http://www.duraclass.com/yield.html.*
Wikander et al., "Finite Element Simulation and Measurement of Welding Residual Stresses", Modelling and Simulation in Materials Science and Engineering, IOP Publishing, Bristol, GB, vol. 2, No. 4, 1994, pp. 845-864.

* cited by examiner

*Primary Examiner*—Eileen D. Lillis
*Assistant Examiner*—Michael Lowe
(74) *Attorney, Agent, or Firm*—James R. Smith; Finnegan, Henderson, Farabow, Garrett&Dunner

(57) ABSTRACT

In the design of load bearing members for use in work machines, it is oftentimes beneficial to minimize the weight of such structures which, in turn, may allow for increased payloads and decreased cycle times of the work machine. A load bearing arrangement for use with a work machine of the type having a platform is provided. The load bearing arrangement comprises a plurality of pieces connectable to form a member structured and arranged for pivotable attachment to the platform. A weldment connects at least two of the pieces where at least one weldment is simulated for effects of heat on at least one of the pieces subject to the weldment.

18 Claims, 6 Drawing Sheets

Fig. 9.

Fig_10_

Fig-11

LOAD BEARING MEMBER ARRANGEMENT AND METHOD

TECHNICAL FIELD

This invention relates to a load bearing member arrangement and method and, more specifically, to such a load bearing member and method thereof in which weld simulation, material preparation, and structural changes to the load bearing members all contribute in producing a load bearing member of reduces weight while not sacrificing the strength of such members.

BACKGROUND

Load bearing members such as booms, sticks, crane booms and so forth typically must support loads which may produce a resultant load acting transversely across the member. Improvements in manufacturing processes such as the welding process allow for an improvement in the ability of the member to withstand such loads. It has been shown that fatigue strength, particularly at weld locations, is the limiting design factor when designing these types of structures. It is generally accepted that welding induces high tensile residual stresses in the local weldment region resulting in the presence on a microscopic level of small sharp discontinuities along the weld toe. These discontinuities, in turn, act as crack propagators, especially when the load bearing member is subjected to cyclic loading conditions. These improvements in the manufacturing processes, in turn, allow for use of thinner materials in creating these members resulting in possibly increased payloads and improved cycle times due to the decrease in weight of such structures.

SUMMARY OF THE INVENTION

In accordance with an embodiment of the present invention, a load bearing arrangement for use with a work machine of the type having a platform is provided. The load bearing arrangement comprises at least one member structured and arranged for coupling to the platform; the member having an end comprising a material having a first yield strength; an aperture formed in the end and having an aperture wall; at least one support member contained within the opening adjacent to at least a portion of the aperture wall; and the support member having a second yield strength greater than said first yield strength.

In accordance with yet another aspect of the present invention, a load bearing arrangement for use with a work machine of the type having a platform is provided. The load bearing arrangement comprises a plurality of pieces connectable to form a member structured and arranged for pivotable attachment to the platform; a weldment connecting at least two of the pieces; and at least one weldment being simulated for effects of heat on at least one of the pieces subject to the weldment.

In accordance with even yet another aspect of the present invention, a method of manufacturing a load bearing member, comprising a plurality of pieces, for use with a work machine, is provided. The method comprises the steps of forming the pieces; connecting at least two of the pieces by a weldment; and determining the effects of heat caused by the weldment on at least one of said pieces subject to said weldment.

DETAILED DESCRIPTION

Figure 1:
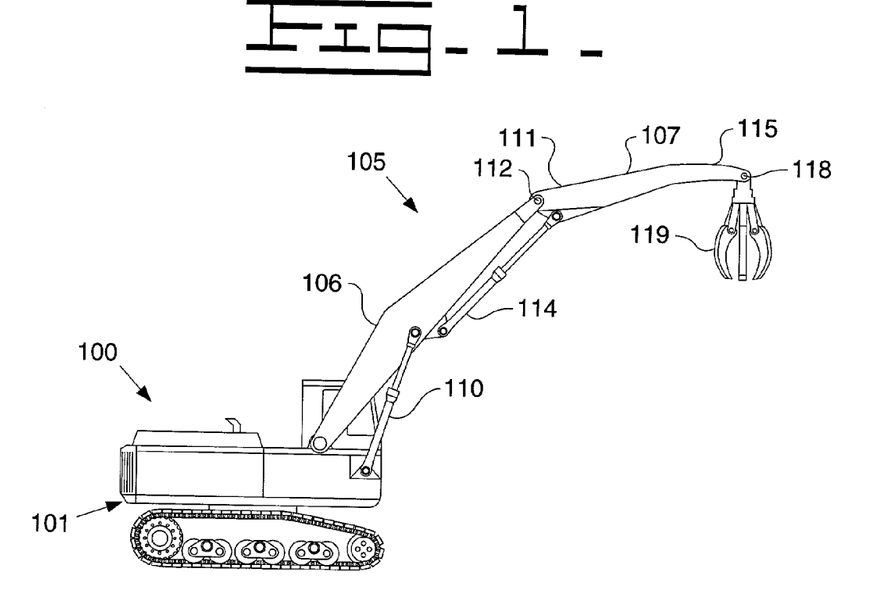
FIG. 1 is a side elevation view of an exemplary work machine embodying the principles of the present invention.

With reference now to the Figures, shown in FIG. 1 is an exemplary work machine 100 incorporating the teachings of the present invention. The work machine 100 comprises a platform 101 onto which is mounted a plurality of load bearing members 105 embodied herein by a first member or boom 106 and a second member or stick 107. The boom 106 is pivotally connected to the platform 101 and moveable relative thereto by a first movement means embodied herein by a pair of first hydraulic actuators 110 which may comprise an extensible and retractable hydraulic cylinders. Likewise, the first end 111 of the stick 107 is pivotally coupled to the boom 106 via a suitable connector such as a pin 112 and is moveable relative to the boom 106 by a second movement means embodied herein by a second hydraulic actuator 114 which also may comprise an extensible and retractable hydraulic cylinder. It is to be understood that the work machine 100 shown herein is embodied by a barge unloader, however such a showing is exemplary only and it is contemplated that the teachings of the present invention may have wide applicability for work machines used to support loads such as, for example, backhoe loaders, excavators and so forth.

Attached adjacent the second end 115 of stick 107, also by use of a suitable connector such as a pin 118, is an attachment 119 for use in grasping and holding a load of material which may comprise debris, dirt, rock, goods or other material types. The attachment 119 shown herein is embodied herein by a clamshell bucket although it is contemplated that such a showing is for purposes of illustration and not limitation and that other attachment types may also be used without deviating from the spirit of the present invention. The attachment 119 may also include a third hydraulic actuator (not shown) for use in activating the attachment 119.

Figure 2:
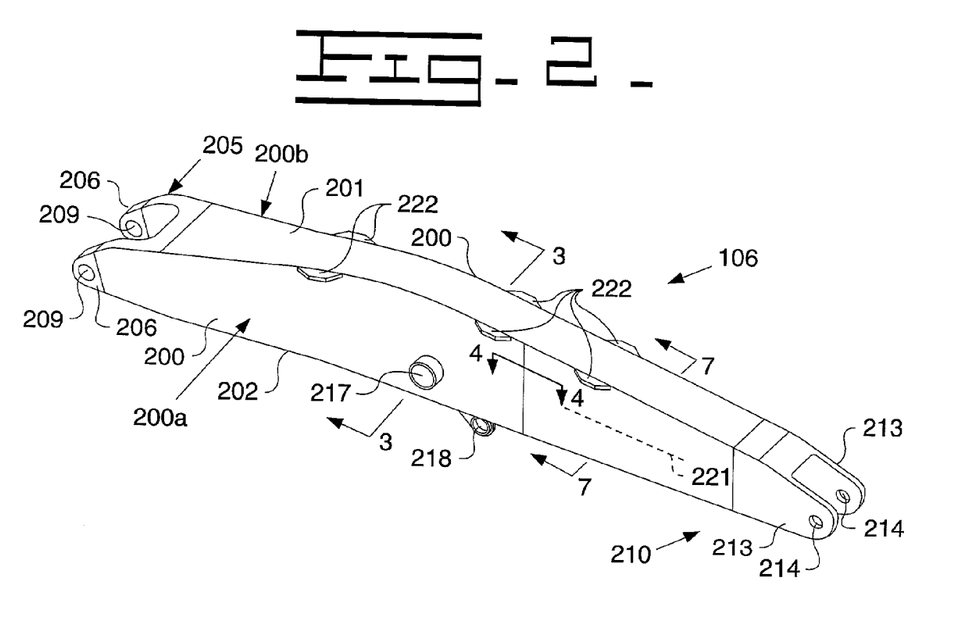
FIG. 2 is an isometric view of a member comprising a boom embodying the principals of the present invention.

With reference now to FIG. 2, the boom 106 is shown incorporating the teachings of the present invention. The boom 106 comprises a pair of spaced apart side plates 200, each forming a respective first side 200a and a second side 200b, with each attached preferably by a robotic welding process to a top plate 201 and a bottom plate 202. The boom 106 includes a first end 205 comprising a pair of ears 206 wherein each ear 206 includes an aperture 209 for receipt of a pin (not shown) or other suitable device for pivotally coupling the boom 106 to the platform 101. The boom 106 also includes a second end 210 also having a pair of ears 213 each having an aperture 214 for receipt of pin 118. An attachment structure 217 extends from each side plate 200 and is used to couple the first hydraulic actuators 110 to the boom 106. Coupling assembly 218 extend from the bottom plate 202 and are used to pivotably support the second hydraulic actuator 114 in a well known manner.

Also shown in hidden detail in FIG. 2 is a reinforcing structure 221 used to reinforce each of the side plates 200 against failure. Although the specific details of the reinforcing structure 221 will be explained in greater detail as this disclosure progresses, suffice to say for now the use of the reinforcing structures 221 of the present invention allows for the use of thinner side plates 200 while preventing buckling of the side plates 200 when load placed on the boom 106 reaches or exceeds a given amount. The top plate 201 may be provided with a plurality of mounting structures 222 used to secure the various hydraulic conduits (not shown) supplying hydraulic fluid to the first and second hydraulic actuators 110,114 as well as the attachment 119. The details of the mounting structures 222 will be described further with reference to FIG. 5.

Figure 3:
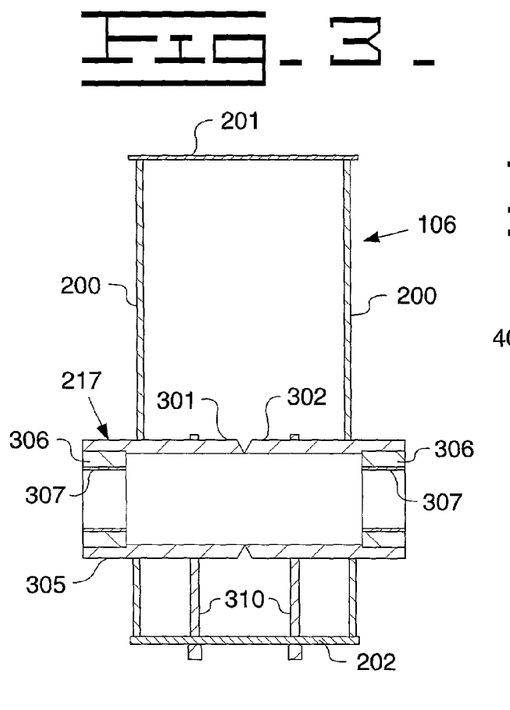
FIG. 3 is a cross-sectional view taken on line 3—3 of FIG. 2.
Figure 4:
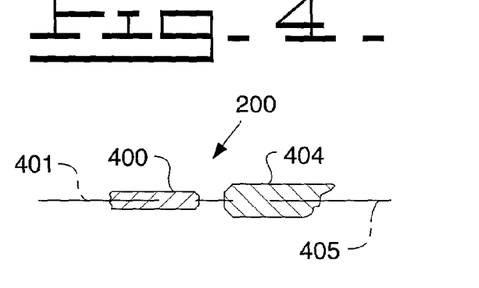
FIG. 4 is a cross-sectional view taken on line 4—4 of FIG. 2.
Figure 5:
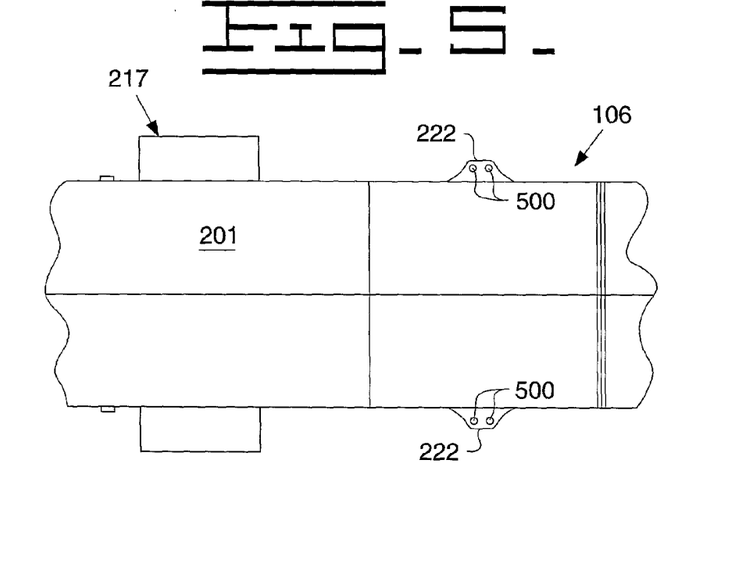
FIG. 5 is a partial top view of the boom shown in FIG. 2.

With reference to FIGS. 3–5, various structural features of the boom 106 will now be discussed. Shown in cross-sectional detail in FIG. 3 is the attachment structure 217 which is used to secure each first hydraulic actuator 110 to the boom 106. The attachment structure 217 is shown comprising two substantially hollow cylindrical members 301 and 302 which may be coupled together in coaxial alignment, but it is to be understood that a single such member may be utilized without deviating from the spirit of the present invention. As shown, the combined length of the attachment structure 217 is sufficient to extend the transverse length of the boom 106 with each distal end 305 of each member 301,302 extending beyond each side plate 200 for a user-selected distance. Placed within each respective member 301,302 adjacent each distal end 305 is a substantially cylindrical support member 306 which is attached to each respective member 301,302 by a suitable method such as laser welding. Although the details of the support member 306 will be discussed in greater detail as this disclosure progresses, suffice to say for now each support member 306 is sized to receive a respective bearing 307 each of which, in turn, supports a pin (not shown) used to secure the first hydraulic actuators 110 to the boom 106.

Figure 9:
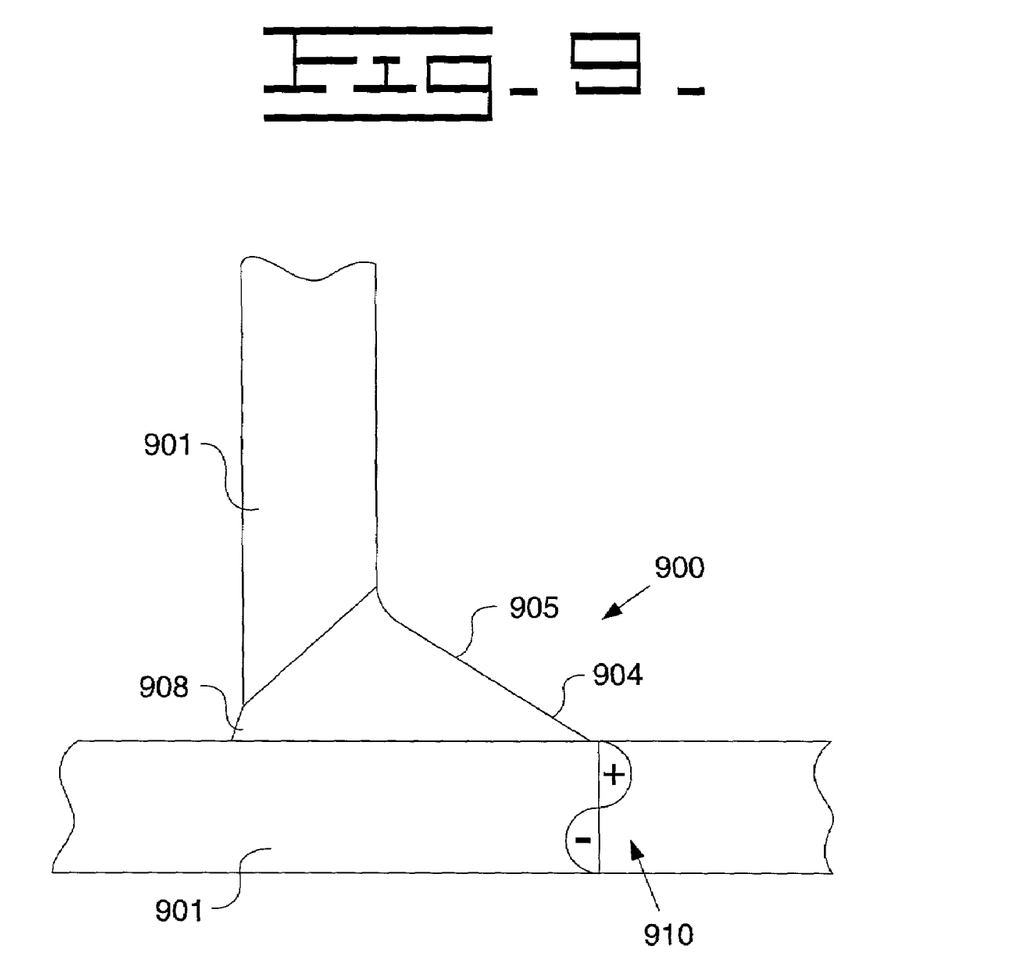
FIG. 9 is a weld formed in accordance with a method of the present invention.
Figure 10:
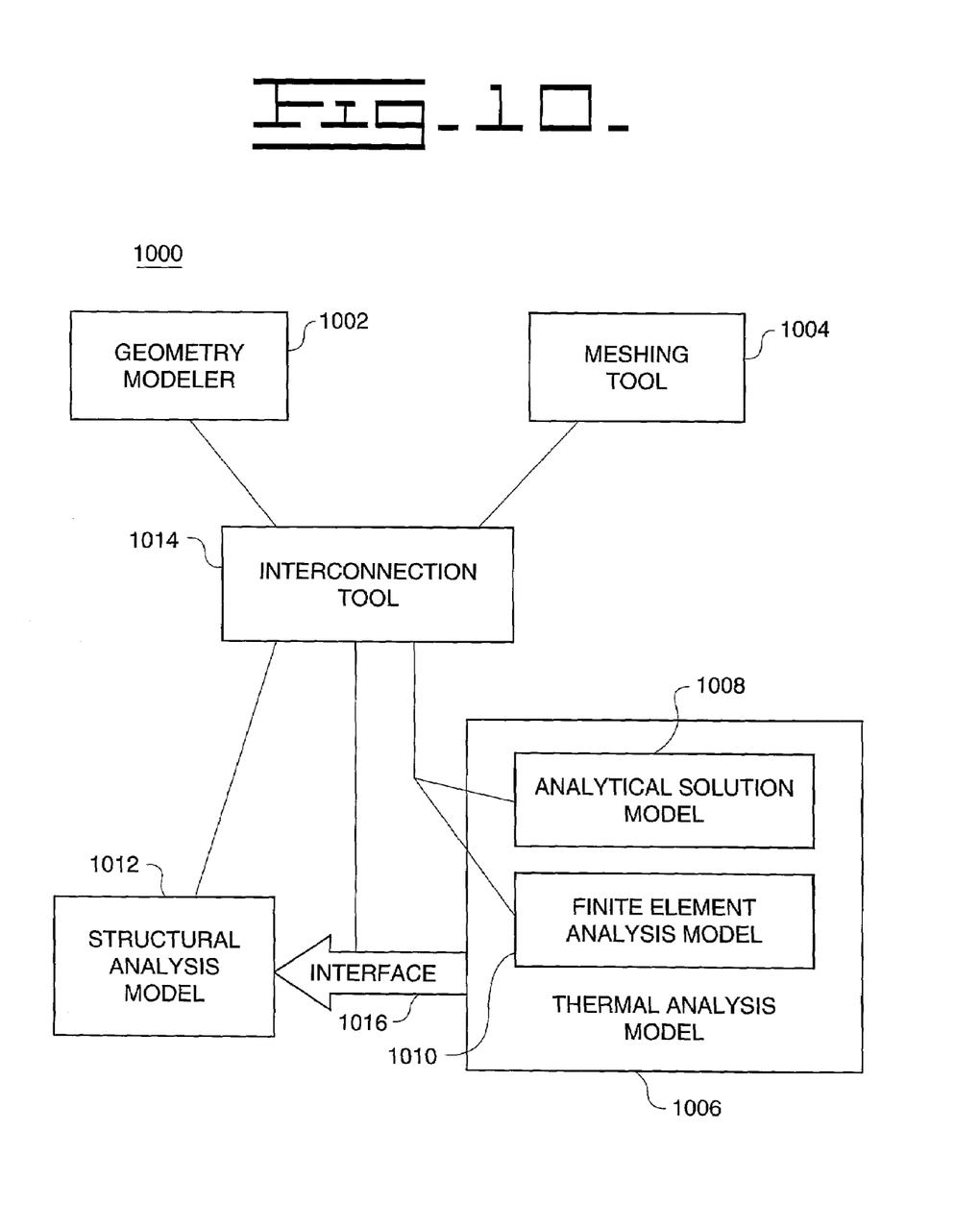
FIG. 10 is a block diagram illustrating an embodiment of an integrated welding simulation model.
Figure 11:
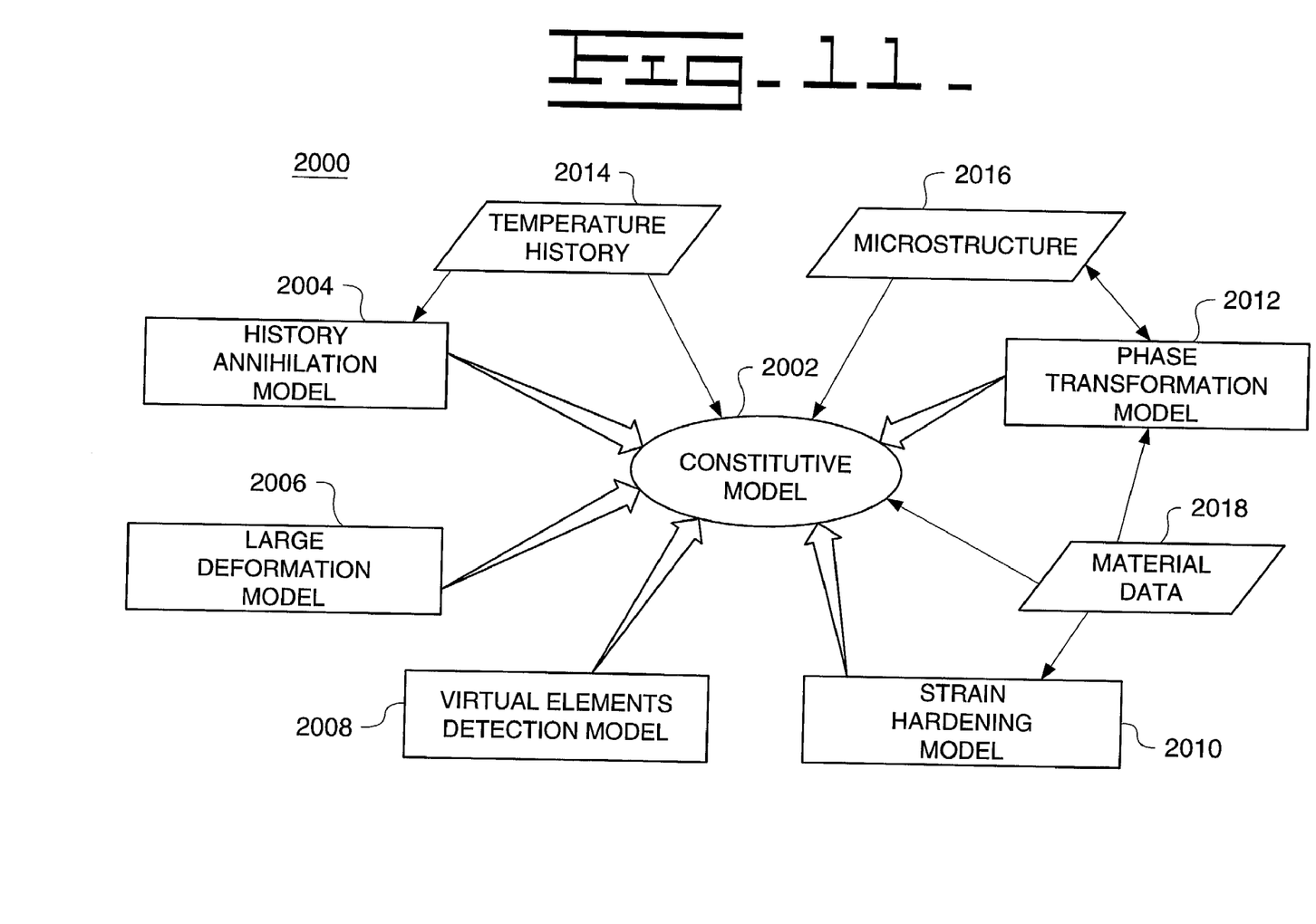
FIG. 11 is a block diagram illustrating an embodiment of a constitutive welding simulation model.

As should be appreciated by those or ordinary skill in such art, each of the side plates 200 may be attached to each respective member 301,302 by a welding process preferably comprising a robotic welding process which may be optimized based on the teaching to be described herein with respect to FIGS. 9–11. When prepared in such a manner the need to provide a conventional attachment structure comprising a heavier casting to compensate for the traditionally weaker weldment is eliminated. To further secure each member 301,302, reinforcement plates 310 may be attached to each member 301,302 by a welding process or other suitable attachment method.

With respect to FIG. 4, shown is an arrangement for coupling the different pieces of the boom 106 in which the pieces may comprise plates of different thicknesses. For exemplary purposes, shown is the side plate 200 comprising two adjacent plates denoted plate 400 having a centerline 401 and plate 404 having a centerline 405. As shown, plates 400 and 404 are attached by a welding or like process such that the centerlines 401,405 are substantially co-linear. By attaching adjacent plates 400 and 404 in such manner, a more uniform distribution of stress flow may be obtained which, in turn, may allow for thinner plates 400 and 404.

Shown in FIG. 5 is a top view of mounting structures 222. Each mounting structure 222 is preferably integrally formed with the top plate 201. As also should be appreciated, forming the mounting structures 222 as a part of the top plate 201 eliminates the need to weld such attachment structures to the top plate 201 which, in turn, eliminates tensile residual stresses in the local weldment region which may require the need to utilize thicker plate materials. Each mounting structure may be provided with apertures 500 each sized to receive a suitable fastener (not shown) for use in securing the hydraulic conduits to the top plate 201 by use of a bracket (not shown) or other suitable attachment device.

Figure 6:
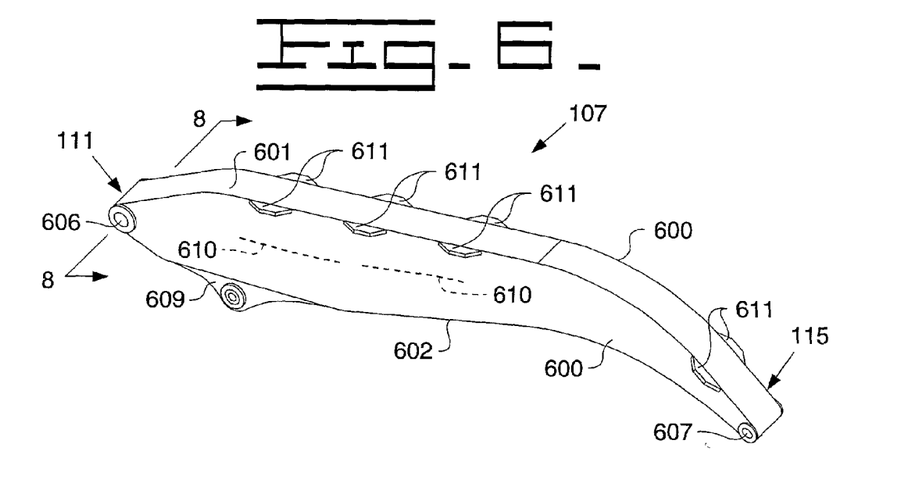
FIG. 6 is an isometric view of a member comprising a stick embodying the principals of the present invention.

With reference now to FIG. 6, the stick 107 is shown also incorporating the teachings of the present invention. The stick 107 also comprises a pair of spaced apart side plates 600 each attached, also preferably by a robotic welding process, to a top plate 601 and a bottom plate 602. The stick 107 includes the first end 111 sized to fit between the ears 213 of the second end 210 of the boom 106. The first end 111 further includes an aperture 606 for receipt of pin 112 thereby providing for the aforementioned pivotal attachment to the boom 106. The second end 115 of the stick 107 also includes an aperture 607 sized to receive pin 118. Coupling assembly 609 extend from the bottom plate 602 and is used to pivotably support the second hydraulic actuator 114 in a well known manner.

Also shown in hidden detail in FIG. 6 are a plurality of reinforcing structures each denoted by the reference numeral 610 which are used to reinforce each of the side plates 600 against buckling at pre-determined buckling prone areas. Although the specific details of the reinforcing structures 610 will also be explained in greater detail as this disclosure progresses, suffice to say for now the use of the reinforcing structures 610 of the present invention also allows for the use of thinner side plates 600 on the stick 107 while preventing buckling of the side plates 600 at pre-determined buckling prone areas when loads placed on the stick 107 reach or exceed a given amount. It should be appreciated by those of ordinary skill in such art, that the number of reinforcing structures 221,610 to be used is a matter of design selection and need not constitute any more than is necessary to achieve the needed performance, and by limiting the number of reinforcing structures 221,610 used the weight of the boom 106 and the stick 107 may be minimized. The top plate 601 may also be provided with mounting structures 611 which are used to secure the various hydraulic conduits (not shown) supplying hydraulic fluid to the first and second hydraulic actuators 110,114 as well as the attachment 119. The details of the mounting structures 611 are substantially similar to those of mounting structures 222 described above and so will not be described any further herein.

With reference to the cross-sectional shown in FIG. 7, the location and configuration of the reinforcing structures 221, 610 will now be discussed. For purposes of brevity the following discussion will be limited to the reinforcing structure 221 for the boom 106, however it is to be understood that the disclosure herein is equally applicable to the reinforcing structures 610 used for the stick 107. As shown, at least one reinforcing structure 221 is attached to an inner surfaces 700 of the side plates 200 by a suitable attachment method preferably a laser welding method. As should be appreciated by those of ordinary skill in such art, it has been found that the use of laser welding to attach the reinforcing structure 221 to the side plates 200 reduces the heat effected zone surrounding the weld area, thereby allowing for thinner side plates 200 then would otherwise be required for different welding-type attachment methods. It is to be understood that the attachment location of each reinforcing structure 221 is exemplary only and it is contemplated that other attachment locations for the reinforcing structures 221 may be had such as, for example, the outer surface 701 of each of the side plates 200.

As shown, each reinforcing structure 221 comprises a substantially straight member having a base portion 704 and a rib portion 705 extending from the base portion 704. The reinforcing structure 221 may comprise a metallic or other rigid material and has a length which is user-selected based on the failure analysis performed by using a suitably selected failure analysis package such as Nastran (TM). Furthermore, it is also contemplated that other geometry's for the reinforcing structure 221 may also be used with deviating from the spirit of the present invention such as, for example, a cylindrical or flat configuration.

Figures 7, 8:
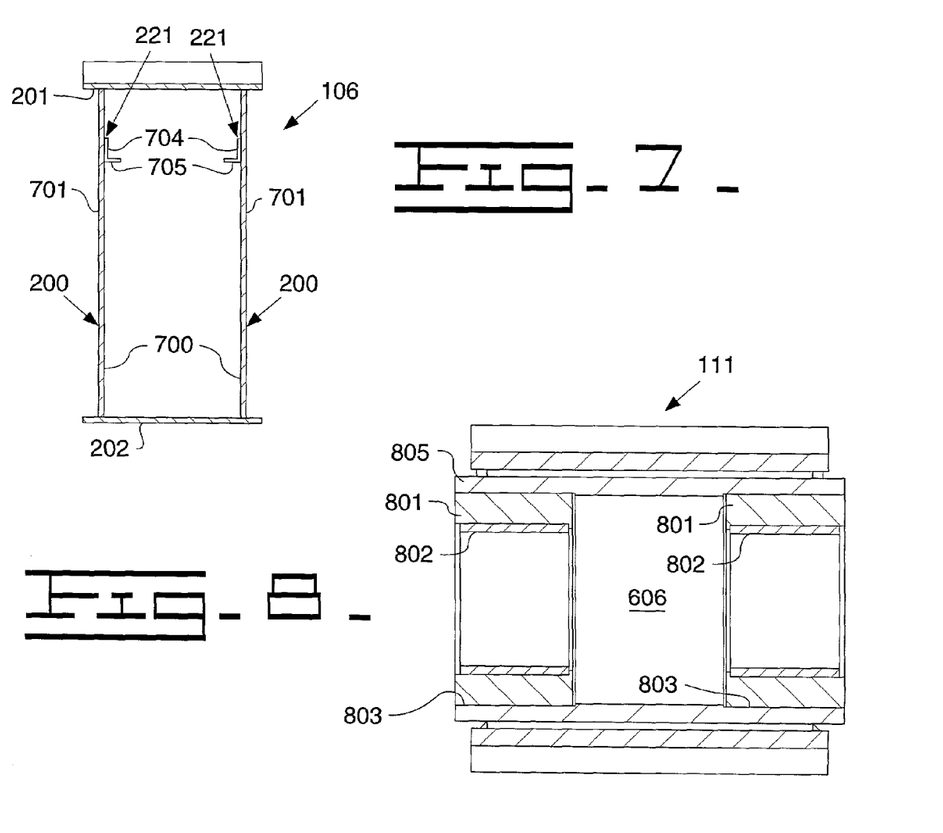
FIG. 7 is a cross-section view taken on line 7—7 of FIG. 2.
FIG. 8 is a cross-sectional view taken on line 8—8 of FIG. 6.

Shown in cross-section in FIG. 8 are the details of the first end 111 of stick 107. A pair of substantially cylindrical support members 801 are received within the aperture 606 are used to house a corresponding pair of bearings 802 which, in turn, support pin 112. Each of the support members 801 are sized to lie adjacent to the aperture wall 803 and each are preferably laser welded to the surrounding stick material denoted 805. In addition, and the material comprising each support member 801 is preferably chosen to have a yield strength exceeding that of the surrounding stick material 805. In selecting a material for the support members 801 having a higher yield strength then the surrounding stick material 805, the support members 801 can absorb the radial stresses produced by pressure fitting the bearings 802 into the respective support members 801 which allows for less stick material 805 surrounding the aperture 606 then otherwise would be required. By providing for less stick material 805 at the first end 111, the effective moment arm between the stick 107 and the boom 106 may be decreased resulting in a decreased stress level produced in the stick 107 for the same relative loading condition. As should be apparent to those of ordinary skill in such art, support members exhibiting similar properties can be provided in the remaining stick aperture 607, the boom apertures 209 and 214, as well as the support members 306 used with the attachment structure 217.

Shown in FIG. 9 is a diagrammatical representation of the weldment 900 created to secure two plates together both denoted as 901. The weld geometry of the weldment 900 includes a weld toe 904, a weld profile 905 and a penetration 908. In the manufacture of the load bearing members 105 described herein, it is advantageous to control the resultant residual stresses at the location of the weldment. For example, the stress diagram denoted 910 illustrates the resultant residual stress located under the weld toe 904 with "+" indicating a compressive residual stress, and "−" indicating a tensile residual stress. At the weld toe 904 it is desirable to achieve a compressive residual stress without the need for any post weld treatment of the weldment 900. To control the resultant residual stress at the location of the weldment 900, the weld simulation tools to be discussed immediately hereinafter may be utilized. The results of the simulation may then be used to control the weld process which preferably comprises a robotic welding process. To control the fit-up of the plates 901 as well as the penetration 908, it is preferred that the plates are formed from a precision cutting operation such as laser cutting.

Referring to FIG. 10, a block diagram illustrating a preferred embodiment of a set of integrated models 1000 for performing a simulation analysis of a welding process is shown. The integrated models 1000 work together to determine stresses and distortions of a material which is welded in the welding process. The stresses and distortions have an adverse effect on the strengths and characteristics of the material. Therefore, it is desired to model the stresses and distortions and use the information from the models to determine methods which may minimize the adverse effects of welding.

In the preferred embodiment, an interconnection tool 1014, such as a graphical user interface (GUI), interconnects the models into an integrated network of working models to determine stresses and distortions of the material. The interconnection tool 1014 is preferably computer-based and may be configured to operate autonomously, through manual intervention, or some combination of the two modes. For example, the interconnection tool 1014 may coordinate the modeling functions while displaying the status and results to a human, who may override the system or input additional information at any desired time.

A geometry modeler 1002 determines the geometry model for the materials to be welded. Preferably, the geometry modeler 1002 simplifies the geometry by removing unnecessary features of the materials from the model. Examples of such features include, but are not limited to, chamfers, holes, slight irregularities, and the like.

The geometry model data is then delivered to a meshing tool 1004. The meshing tool 1004 is used to generate a finite element analysis mesh, preferably by defining coordinates for elements and nodes which constitute the mesh. Finite element analysis techniques which use mesh coordinates are well known in the art and will not be described further.

A thermal analysis model 1006 is used to perform a thermal analysis of the materials during the welding process. In the preferred embodiment, the thermal analysis model 1006 includes at least two models. An analytical solution model 1008 provides a rapid analytical solution of the thermal process, i.e., welding process, for a global solution of distortions caused by the welding process. A finite element analysis model 1010 provides local detailed analysis of residual stress from the welding process.

In the preferred embodiment, the analytical solution model 1008 determines solutions of point heat sources, the point heat sources being obtained from heat input based on welding processes and reflected heat sources determined from adiabatic boundary conditions of the material. The total analytical solution is determined from superposition of all the point heat sources. The principle of obtaining reflected heat sources from adiabatic boundary conditions is well known in the art and will not be discussed further. The analytical solution model 1008 provides a rapid solution for the complete welding process. However, the solution is not highly detailed. Therefore, the analytical solution model 1008 is typically used when a fast, global solution is desired, and a high degree of detail is not needed.

The finite element analysis model 1010 employs numerical computations of conditions at each of the desired node and element coordinates of the finite element analysis mesh. The finite element analysis model tends to be computationally lengthy and intensive. Therefore, the finite element analysis model 1010 is generally used only when a detailed analysis of a specific portion of the model is desired.

The information from the thermal analysis model 1006 is compiled into a thermal history and delivered to a structural analysis model 1012. In addition, the finite element mesh provided by the meshing tool 1004 is delivered to the structural analysis model 1012. The interconnection is automatically established in the interconnection tool 1014. In the preferred embodiment, the thermal history is delivered from the thermal analysis model 1006 to the structural analysis model 1012 by way of an interface module 1016. Preferably, the interface module 1016 is automated from the interconnection tool 1014 and is adapted to seamlessly connect the thermal solution from the analytical solution model 1008, the finite element analysis model 1010, or both, to the structural analysis model 1012.

The structural analysis model 1012 provides further analysis of the materials during the welding process. Typically, the behavior of the material during welding is analyzed and modeled. Examples of features analyzed include, but are not limited to, melting and remelting of the material, phase transformation of the material, cyclic effects of multiple weld passes, and the like. The stresses and distortions of the material are determined by the structural analysis model. Preferably, the determined stresses and distortions may be further analyzed and subsequently used to modify the welding process to reduce the adverse effects of the extreme heat associated with welding.

Referring to FIG. 11, a model 2000 of the weld process is shown, which is based on a constitutive model 2002. Constitutive models, e.g., for welding process simulation, are well known in the art and have been used for many years. A constitutive model is a model based on a compilation of physical laws associated with the phenomenon desired to be modeled.

A history annihilation model 2004 models melting/remelting of the material during the weld process. In addition, annealing of the material during cyclic melting/remelting of the material during multiple weld passes is modeled. As the material melts, the deformation history, i.e., the stresses and deformations, of the material is eliminated, and the material is restored to a virgin state. Therefore, for accurate modeling of the welding process, stresses and distortions must be reset in response to the occurrence of a melting/remelting condition.

A large deformation model 2006 is used to model thermal and mechanical strain increments of the material being welded. More specifically, the large deformation model 2006 models the distinguishing characteristics between plastic and elastic annealing strains during the welding process.

A virtual elements detection model 2008 provides virtual elements for weld passes which have not actually occurred. In a multiple pass welding process, models must include all passes before any weld metal is actually deposited. For example, the stiffness of the material must be modeled as though all weld passes have been completed, even though welding has not begun. Typical welding model packages compensate for this by a process known as element birth and death. The finite elements of the weld metal must be deactivated until later in the modeling process. This method is very tedious and requires much time and computational power to perform, since the elements must be removed from the files and restored later. The virtual elements detection model 2008 overcomes this by assuming that the weld metal has been deposited at a minimal stiffness. As the subsequent weld passes are performed, the metal stiffness from each pass is modified to more closely reflect the actual stiffness created by the welding process. In the preferred embodiment, the virtual elements detection model 2008 is a three-dimensional model to provide modeling not only of the portion of the material being welded, but to also provide modeling of portions of the material to be welded as the overall weld process takes place.

A strain hardening model 2010 models the yield strength which increases as a result of the thermal cycles associated with the multiple weld passes. Yield strength increases as the stresses and strains of welding move from a zero state to a yield state, i.e., from before heating the material to a point just prior to the material yielding to the application of the heat. The strain hardening model 2010 is adapted to perform a series of iterations to determine the increments of plastic strain of the material.

A phase transformation model 2012 models changes in the microstructure of the material during the welding process. The changes in the microstructure of the material are a function of parameters such as the chemical composition of the material, conditions of the welding process, and the like. Changes in the material include, but are not limited to, volumetric changes during the phase transformation, transformation plasticity, and yield hysteresis due to phase differences in the heating and cooling processes.

A temperature history database 2014 stores and provides a temperature history of the material during the welding process. Preferably, the temperature history database 2014 provides temperature history data to the constitutive model 2002 and the history annihilation model 2004.

A microstructure database 2016 stores and provides data of the microstructure of the material during the welding process. Preferably, the microstructure database 2016 provides microstructure data to the constitutive model 2002 and the phase transformation model 2012. In addition, the microstructure database 2016 may receive microstructure data of the material from the phase transformation model 2012.

A material data database 2018 stores and provides data of the material, e.g., stresses and strains of the material, during the welding process. Preferably, the material data database provides data to the constitutive model 2002, the strain hardening model 2010, and the phase transformation model 2012.

INDUSTRIAL APPLICABILITY

In use and in operation, the present invention provides for weight savings in load bearing members 105 while maintaining the same payload capacity of the work machine 100. As should be appreciated by those of ordinary skill in such art, controlling the amount of distortion and residual stresses at the weldment 900 provides for a weld having a greater fatigue life then otherwise would be possible. The present invention also utilizes an enhanced and more accurate model of the stresses and distortions which occur during a welding process, as compared to typical welding process models currently known. The characteristics of the materials being welded are modeled as temperatures approach levels which cause changes in the material properties. Examples of welding related material behaviors which are modeled include, but are not limited to, melting/remelting caused by multiple weld passes, material history annihilation caused by annealing, thermal cycling, i.e., alternate heating and cooling of the material, phase transformations, and the like. The results of the above modeling are incorporated into a constitutive weld model to provide a complete model of the effects of the weld process. This complete model may then be used to minimize adverse effects caused by welding.

In addition, it should also be appreciated by those of ordinary skill in such art, the use of support members 306,801, integral mounting structures 222,611, aligned centerlines 401,405, reinforcing structure 221,610 and the attachment structure 217 all as illustrated and described herein may contribute to a further weight savings in the weight of these structures.

Other aspects, objects and advantages of this invention can be obtained from a study of the drawings, the disclosure and the appended claims.

What is claimed is:

1. A load bearing arrangement for use with a work machine of the type having a platform, comprising:
    a first load bearing member structured and arranged for coupling to the platform;
    a second load bearing member structured and arranged for coupling to the first load bearing member;
    said second load bearing member having an end comprising a material having a first yield strength;
    an aperture formed in said end and having an aperture wall;
    at least one support member contained within said aperture adjacent to at least a portion of said aperture wall, said support member having an opening sized to receive a bearing; and
    said support member having a second yield strength greater than said first yield strength.

2. The load bearing arrangement as set forth in claim 1 wherein said support member is laser welded to said end.

3. The load bearing arrangement as set forth in claim 1 wherein the first load bearing member comprises:
    at least one top plate;
    at least one bottom plate; and
    at least one pair of spaced apart side plates each attached to said top plate and said bottom plate.

4. The load bearing arrangement as set forth in claim 3 wherein said top plate comprises at least one integral mounting structure.

5. The load bearing arrangement as set forth in claim 3 further comprising:
    a substantially cylindrical attachment structure extending from at least one of said at least one pair of side plates; and
    wherein said at least one of said pair of side plates is attached to said attachment structure.

6. The load bearing arrangement as set forth in claim 5 wherein:
    said first load bearing member has a transverse width; and
    said attachment structure spans said transverse width.

7. The load bearing arrangement as set forth in claim 3 further comprising at least one reinforcing structure attached to at least one of said at least one pair of side plates.

8. The load bearing arrangement as set forth in claim 7 wherein said reinforcing structure comprises:
    a base portion; and
    a rib portion extending from said base portion such that the cross section of the reinforcing structure is "L" shaped.

9. The load bearing arrangement as set forth in claim 7 wherein said reinforcement structure is laser welded to said at least one of said pair of side plates.

10. The load bearing arrangement as set forth in claim 1 further comprising an attachment pivotally coupled to said second load bearing member.

11. The load bearing arrangement as set forth in claim 10 wherein said attachment comprises a bucket.

12. A load bearing arrangement for use with a work machine of the type having a platform, comprising:
    at least one load bearing member structured and arranged for coupling to the platform, wherein
    said load bearing member comprises a first side and a second side;
    one of said first side or said second side comprises a plurality of side plates;
    each said side plate having a centerline axis; and
    at least two adjacent side plates, each having a different thickness, on one of said first side or said second side are coupled together such that said centerline axis of each said side plate are colinear.

13. A load bearing apparatus, comprising:
    a work machine having a platform;
    at first member, having a longitudinal axis, coupled to said platform;
    a first movement means for moving said first member relative to said platform;
    a second member, having a longitudinal axis, pivotally coupled to said first member;
    a second movement means for moving said second member relative to said first member;
    a first end attached to the second member and comprising a material having a first yield strength:
    an aperture formed in the first end and having an aperture wall;
    at least one support member contained within the aperture adjacent to at least a portion of the aperture wall, said support member having an opening sized to receive a bearing; and
    the support member having a second yield strength greater than said first yield strength.

14. The load bearing apparatus as set forth in claim 13 wherein said first and said second movement means comprises hydraulic cylinders.

15. The load bearing apparatus as set forth in claim 13 further comprising an attachment attached adjacent a second end of said second member.

16. The load bearing apparatus as set forth in claim 15 wherein said attachment comprises a bucket.

17. A load bearing member in a load bearing arrangement for use with a work machine, comprising:
    an end comprising a material having a first yield strength;
    an aperture, having an aperture wall, formed in the end;
    at least one support member comprising a material having a second yield strength, wherein the support member is contained within the aperture adjacent to at least a portion of said aperture wall and the second yield strength is greater than the first yield strength; and
    at least one bearing, pressure-fitted in the support member, structured to receive a pin.

18. The load bearing member according to claim 17, wherein the support member is laser welded to the end.

* * * * *